United States Patent
Olgaard et al.

(10) Patent No.: US 10,296,433 B2
(45) Date of Patent: May 21, 2019

(54) METHOD FOR TRANSFERRING AND CONFIRMING TRANSFER OF PREDEFINED DATA TO A DEVICE UNDER TEST (DUT) DURING A TEST SEQUENCE

(75) Inventors: Christian Volf Olgaard, Saratoga, CA (US); Sheguang Yin, San Jose, CA (US); John Christopher Lukez, Morgan Hill, CA (US)

(73) Assignee: LitePoint Corporation, Sunnyvale, CA (US)

( * ) Notice: Subject to any disclaimer, the term of this patent is extended or adjusted under 35 U.S.C. 154(b) by 277 days.

(21) Appl. No.: 13/486,471

(22) Filed: Jun. 1, 2012

(65) Prior Publication Data
US 2013/0326274 A1 Dec. 5, 2013

(51) Int. Cl.
G06F 11/00 (2006.01)
G06F 11/273 (2006.01)
G06F 11/263 (2006.01)

(52) U.S. Cl.
CPC ........ *G06F 11/2733* (2013.01); *G06F 11/263* (2013.01)

(58) Field of Classification Search
CPC ...... G01R 31/31715; G01R 31/318558; G01R 31/31707; G01R 31/31926;
(Continued)

(56) References Cited

U.S. PATENT DOCUMENTS 5,740,352 A * 4/1998 Philipp ................. G01R 31/28
714/40
5,940,472 A * 8/1999 Newman ............. H04M 3/2254
379/10.02

(Continued)

FOREIGN PATENT DOCUMENTS

CN 101455009 A 6/2009
CN 102090022 A 6/2011

(Continued)

OTHER PUBLICATIONS

International Search Report and Written Opinion dated Aug. 23, 2013 for PCT Application No. PCT/US2013/038209.

(Continued)

*Primary Examiner* — Loan L.T. Truong
(74) *Attorney, Agent, or Firm* — Fountainhead Law Group, P.C.

(57) ABSTRACT

A method for testing a device under test (DUT) during a test sequence. In accordance with one embodiment, during a regular, pre-defined test sequence, data packets are transferred from a tester to a device under test (DUT) containing data related to at least one of an identification parameter of the DUT, an operational characteristic of the DUT and a request for data. Examples of such transferred data include address data for identifying the DUT (e.g., a unique media access control (MAC) address) and calibration data for controlling an operational characteristic of the DUT (e.g., signal power levels, signal frequencies or signal modulation characteristics). In accordance with another embodiment, the DUT retrieves and transmits data to the tester, either in response to the request for data or as a preprogrammed response to its synchronization with the tester.

9 Claims, 6 Drawing Sheets

(58) Field of Classification Search
CPC .......... G01R 31/31716; G01R 31/3191; G01R 31/31907; G01R 1/07385; G01R 31/2834; G01R 31/31717; G01R 31/31722; G01R 31/318307; G01R 31/319; G01R 31/31905; G06F 11/2733; G06F 11/2294; G06F 11/263; G06F 11/3688; H04L 43/50
USPC .......................................................... 714/43
See application file for complete search history.

(56) References Cited

U.S. PATENT DOCUMENTS

| | | | | |
|---|---|---|---|---|
| 6,028,439 | A * | 2/2000 | Arkin | G01R 31/31907 324/762.02 |
| 6,057,679 | A * | 5/2000 | Slizynski | G01R 31/316 324/762.02 |
| 6,304,633 | B1 * | 10/2001 | Adachi | H04M 3/323 379/1.01 |
| 6,314,531 | B1 * | 11/2001 | Kram | H04M 3/242 709/243 |
| 6,425,096 | B1 * | 7/2002 | Liese | G06F 11/2294 714/32 |
| 6,480,979 | B1 * | 11/2002 | Tomari | G01R 31/3193 714/718 |
| 6,671,839 | B1 * | 12/2003 | Cote et al. | 714/726 |
| 6,970,816 | B1 * | 11/2005 | Bryan | G06F 17/5022 703/13 |
| 7,567,521 | B2 | 7/2009 | Olgaard et al. | |
| 7,657,789 | B1 * | 2/2010 | Gerber et al. | 714/25 |
| 7,689,213 | B2 | 3/2010 | Olgaard et al. | |
| 7,702,984 | B1 * | 4/2010 | Lee | G06F 12/1416 365/185.33 |
| 8,000,656 | B1 * | 8/2011 | Jiao et al. | 455/67.11 |
| 8,036,617 | B2 | 10/2011 | Olgaard | |
| 8,037,089 | B2 * | 10/2011 | Teng | G01R 31/31907 324/537 |
| 8,085,685 | B2 | 12/2011 | Olgaard | |
| 8,693,351 | B2 * | 4/2014 | Olgaard | H04L 1/24 370/241 |
| 8,913,504 | B2 * | 12/2014 | Olgaard | H04L 43/12 370/241 |
| 8,964,567 | B2 * | 2/2015 | Glozman | H04W 24/06 370/241 |
| 9,015,538 | B2 * | 4/2015 | Olgaard | H04W 24/06 714/712 |
| 9,178,629 | B2 * | 11/2015 | El-Hassan | H04B 17/0085 |
| 9,319,154 | B2 * | 4/2016 | Olgaard | H04B 17/00 |
| 2003/0004680 | A1 * | 1/2003 | Dara-Abrams | G06F 11/2294 702/183 |
| 2003/0030453 | A1 * | 2/2003 | Mayder et al. | 324/754 |
| 2003/0237018 | A1 * | 12/2003 | Baba | G06F 11/2038 714/4.1 |
| 2004/0006728 | A1 * | 1/2004 | Scholten | G01R 31/31725 714/724 |
| 2004/0133653 | A1 * | 7/2004 | Defosse | G06Q 20/04 709/217 |
| 2004/0193990 | A1 * | 9/2004 | Ichiyoshi | G01B 31/31830 714/742 |
| 2005/0141521 | A1 * | 6/2005 | Li | H04L 29/12009 370/395.54 |
| 2006/0012388 | A1 * | 1/2006 | Lin | H04W 24/00 324/754.08 |
| 2006/0069967 | A1 * | 3/2006 | Almy | G01R 31/31932 714/724 |
| 2006/0180659 | A1 * | 8/2006 | Loffredo | G06F 3/1205 235/380 |
| 2007/0061659 | A1 * | 3/2007 | Yun et al. | 714/742 |
| 2007/0075719 | A1 * | 4/2007 | Chung | G01R 31/2893 324/750.15 |
| 2007/0216438 | A1 * | 9/2007 | Gupta et al. | 324/765 |
| 2008/0069047 | A1 * | 3/2008 | Yee | H04W 88/06 370/331 |
| 2008/0100328 | A1 * | 5/2008 | Dhong | G01R 31/3004 324/750.3 |
| 2008/0201624 | A1 * | 8/2008 | Kim | G06F 11/263 714/738 |
| 2008/0284454 | A1 * | 11/2008 | Chih | G01R 31/2886 324/754.07 |
| 2008/0293363 | A1 * | 11/2008 | Olgaard | H04B 17/0085 455/67.7 |
| 2010/0008237 | A1 * | 1/2010 | Olgaard | H04L 12/2697 370/249 |
| 2010/0153800 | A1 * | 6/2010 | Wu et al. | 714/736 |
| 2010/0261431 | A1 * | 10/2010 | Olgaard | G01R 31/31713 455/67.11 |
| 2011/0000829 | A1 * | 1/2011 | Linde | B07C 5/344 209/571 |
| 2011/0057663 | A1 * | 3/2011 | Iwamoto | G01R 31/31907 324/537 |
| 2011/0069624 | A1 * | 3/2011 | Olgaard | H04L 43/00 370/252 |
| 2011/0080187 | A1 * | 4/2011 | Hotz | G01R 31/2889 324/756.02 |
| 2011/0204914 | A1 * | 8/2011 | Roberts | G01R 31/2889 324/756.02 |
| 2011/0244814 | A1 * | 10/2011 | Andreu et al. | 455/90.1 |
| 2011/0292809 | A1 * | 12/2011 | Olgaard | H04L 43/50 370/241 |
| 2012/0047411 | A1 * | 2/2012 | Lai et al. | 714/721 |
| 2012/0051224 | A1 * | 3/2012 | Olgaard | H04L 43/50 370/241 |
| 2012/0113829 | A1 * | 5/2012 | Olgaard | H04B 17/00 370/252 |
| 2012/0331343 | A1 * | 12/2012 | Norton | G01B 31/31837 714/25 |
| 2013/0188678 | A1 * | 7/2013 | Olgaard | H04L 25/061 375/224 |
| 2013/0259097 | A1 * | 10/2013 | Olgaard | H04W 56/00 375/219 |
| 2013/0294252 | A1 * | 11/2013 | Olgaard | H04L 43/12 370/241 |
| 2013/0346628 | A1 * | 12/2013 | Canion | H04L 63/0876 709/245 |
| 2013/0346736 | A1 * | 12/2013 | Cook | G06F 9/4416 713/2 |

FOREIGN PATENT DOCUMENTS

| | | |
|---|---|---|
| JP | H09116487 A | 5/1997 |
| JP | H09121189 A | 5/1997 |
| JP | 2003141672 A | 5/2003 |
| KR | 10-2007-0079013 A | 8/2007 |
| KR | 10-2008-0112379 A | 12/2008 |
| KR | 10-2010-00166261 A | 2/2010 |

OTHER PUBLICATIONS

U.S. Appl. No. 13/437,652, filed Apr. 2, 2012, "Method for Enabling a Device Under Test (DUT) to Retry a Portion of a Pre-Defined Test Sequence"; 29 pages.

Chinese Office Action; filed in Chinese Patent Application No. 201380028843.6; dated Sep. 25, 2015; 12 pgs.

Jan. 23, 2017—(TW) Office Action—102117868—Eng Tran, 13 pages.

Mar. 27, 2017—(JP) Office Action—2015-515004—Eng Tran, 4 pages.

\* cited by examiner

METHOD FOR TRANSFERRING AND CONFIRMING TRANSFER OF PREDEFINED DATA TO A DEVICE UNDER TEST (DUT) DURING A TEST SEQUENCE

TECHNICAL FIELD

The present invention relates to a method for transferring and confirming transfer of predefined data by a test system to a device under test (DUT) during a test sequence.

BACKGROUND

One use of wireless technologies following the IEEE 802.11 standard that is expected to grow to very large volumes is in so-called "Internet of Things" (IoT) devices that provide machine-to-machine communications. Like all wireless devices, IoT devices must be tested during manufacture to make sure that they are operational and meet standard-prescribed specifications intended to minimize interference with other wireless devices.

Such IoT devices are expected to be low-cost devices that offer few ways of transferring information to them other than via signals sent to them. Nevertheless, in order to operate in an IoT wireless environment, an IoT device must have, for example, a unique media access control (MAC) address assigned to it. That address will be used, for example, in a header field of a standard Transmission Control Protocol (TCP) and Internet Protocol (IP) (TCP/IP) packet. It would identify the sending machine to another machine receiving the sent packet. In addition, other values, such as calibration data could also be transferred and used during manufacturing test.

A challenge is devising a method whereby a unique MAC address and other values could be transferred during a regular, pre-defined test sequence, thereby minimizing test time and cost, and avoiding a separate information-transfer step. (Systems and methods for testing within an existing test environment in accordance with a pre-defined test sequence have been developed, but do not address assignments of MAC or other device address, or transfer of data. See, e.g., U.S. Pat. Nos. 7,567,521, 7,689,213, 8,036,617 and 8,085,685, and U.S. patent applications Ser. Nos. 12/873,399 and 13/437,652, the disclosures of which are incorporated herein by reference.) In addition, with a large volume of devices with diversified control and interface features, it would be advantageous to have a method that addresses all such devices rather than having specialized methods for each distinct device type.

SUMMARY

In accordance with the presently claimed invention, a method is provided for testing a device under test (DUT) during a test sequence. In accordance with one embodiment, during a regular, pre-defined test sequence, data packets are transferred from a tester to a device under test (DUT) containing data related to at least one of an identification parameter of the DUT, an operational characteristic of the DUT and a request for data. Examples of such transferred data include address data for identifying the DUT (e.g., a unique media access control (MAC) address) and calibration data for controlling an operational characteristic of the DUT (e.g., signal power levels, signal frequencies or signal modulation characteristics). In accordance with another embodiment, the DUT retrieves and transmits data to the tester, either in response to the request for data or as a preprogrammed response to its synchronization with the tester.

In accordance with one embodiment of the presently claimed invention, a method for testing a device under test (DUT) during a test sequence includes:
synchronizing a tester and a device under test (DUT); and
responsive to said synchronizing, performing, with the DUT, at least one of
storing data related to at least one of an identification parameter of the DUT and an operational characteristic of the DUT,
retrieving data, and
transmitting a data packet.

In accordance with another embodiment of the presently claimed invention, a method for operating a tester for testing a device under test (DUT) during a test sequence includes:
transmitting, with a tester, a synchronization initiation signal;
receiving, with the tester, a synchronization confirmation signal from the DUT;
transmitting, with the tester, a data signal including one or more data packets containing data related to at least one of an identification parameter of the DUT, an operational characteristic of the DUT and a request for data;
receiving, with the tester from the DUT, a data packet related to the data signal.

In accordance with still another embodiment of the presently claimed invention, a method for operating a device under test (DUT) during a test sequence includes:
receiving, with the DUT, a synchronization initiation signal from a tester;
transmitting, with the DUT, a synchronization confirmation signal; and
responsive to the synchronization, performing, with the DUT, at least one of
storing data related to at least one of an identification parameter of the DUT and an operational characteristic of the DUT,
retrieving data, and
transmitting a data packet.

DETAILED DESCRIPTION

A method for data transfer between a test system and DUT is described in the context of a pre-defined test sequence. An example of such pre-defined test sequence is described in U.S. Pat. No. 7,689,213. In it, a pre-defined sequence of test packets is conveyed between a tester and DUTs. These are typically broken up into so-called "blocks." The described method takes advantage of this pre-defined test sequence and its block structure, making use of a test-sequence block in the context of a pre-defined test sequence.

The examples described herein are meant to be exemplary and should not limit the scope of the claimed invention which includes a method for transferring data from a test system to a DUT as part of a pre-defined test sequence. In the disclosed examples, the data can be a MAC address which plays a key role in device network identification, and can also include a way for the tester to omit the MAC address assignment step and transfer operational data, such as calibration data to the DUT.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Among other recent innovations to manufacturing testing is using pre-defined test sequences coordinated between test systems and devices under test (DUTs) requiring a minimal amount of non-test communications interactions between the test system and DUT. Such an innovation is described in U.S. Pat. No. 7,689,213.

In the coming wave of IoT devices, there will be a need to transfer MAC address identity values and other information to these devices. An advantageous time to do so is during test, and more specifically, during a test involving pre-defined test sequences (e.g., as described in U.S. Pat. No. 7,689,213).

It is expected that IoT devices will have a wide variety of different capabilities and control processors. Therefore, any process for transferring MAC address and, for example, calibration data using a control processor interface could require many different and incompatible procedures. Therefore, it would be preferable to transfer that data in a way that is consistent across all IoT devices, such as by using a test packet sent from a tester to the IoT device and having the value to be transferred as part of that packet's payload.

Figure 1:
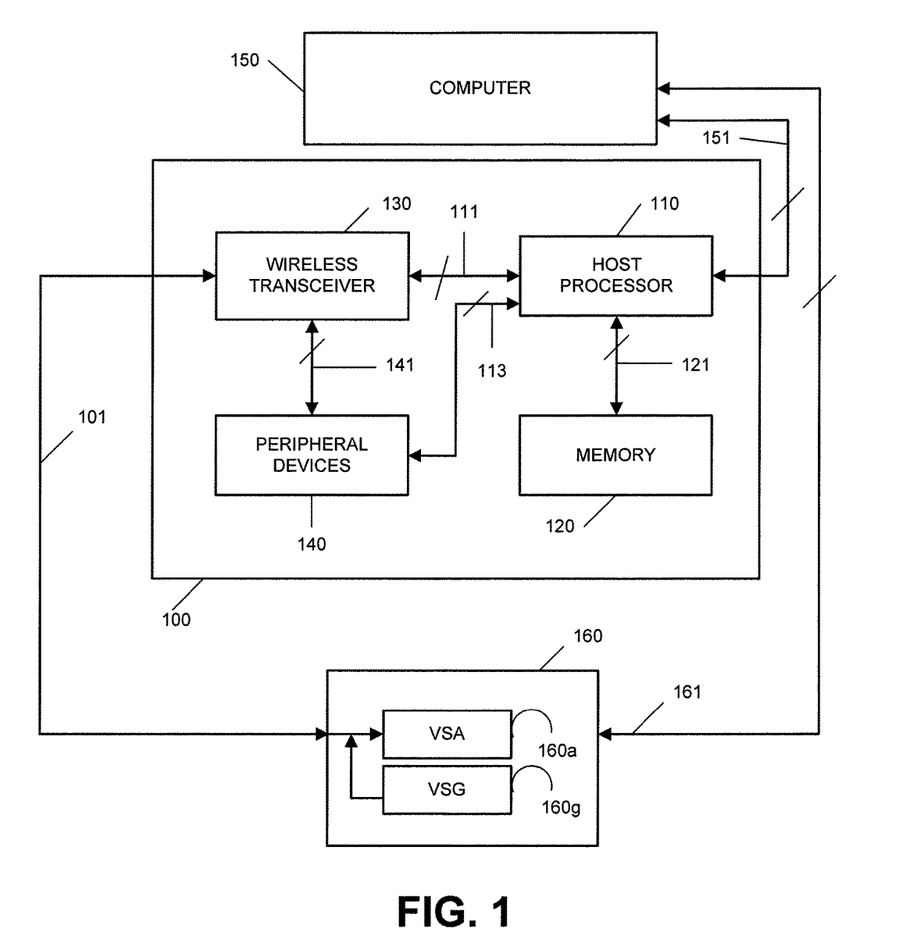
FIG. 1 depicts a functional block diagram of a wireless data communication system in a production test environment.

Referring to FIG. 1, a wireless data communication system in a general production test environment includes the DUT 100, a computer 150 for control of the testing, and test equipment 160 (e.g., including a vector signal generator (VSG) 160g and a vector signal analyzer (VSA) 160a for generating and transmitting test signals to the DUT, and receiving and processing signals from the DUT 100, respectively), all interconnected substantially as shown. The DUT 100 has a number of embedded sub-systems, including a host processor 110, memory 120 (e.g., non-volatile memory), a wireless transceiver 130 and one or more peripheral devices 140, interconnected substantially as shown. The host processor 110 controls the memory 120, wireless transceiver 130 and peripheral devices 140 via various control interfaces 121, 111, 113. Typically, the memory 120 stores, as firmware, programs to be used by the DUT 100. The control computer 150 generally runs the production test software that controls the DUT 100 through an external interface 151, e.g., universal serial bus (USB), serial peripheral interface (SPI), RS-232 serial interface, etc. The control computer 150 also controls the test equipment 160 via another interface 161, e.g., USB, general purpose interface bus (GPIB), Ethernet, etc. The test equipment 160 communicates with the wireless transceiver 130 via an interface 101, which can be a wireless interface, but for production testing purposes is usually a wired interface.

In a typical transmitter test scenario, the control computer 150 will send one or more commands to the host processor 110, which translates such commands into corresponding commands for the wireless transceiver 130. Following transmission of the test signal via the test interface 101, the control computer 150 retrieves the measurement results from the test equipment 160 (via its interface 161), following an appropriate delay for the wireless transceiver 130 to settle at its programmed output frequency and power.

However, while such a production test environment is viable for testing many types of DUTs, IoT devices are expected to have, and in most instances will necessarily have, limited and possibly no interfaces for communicating with a computer/controller 150. Further, even if such an interface is provided, no standard communication protocol currently exists. Accordingly, communication and control paths may be limited to only that possible through the wireless data signal path used during normal device operation.

Figure 2:
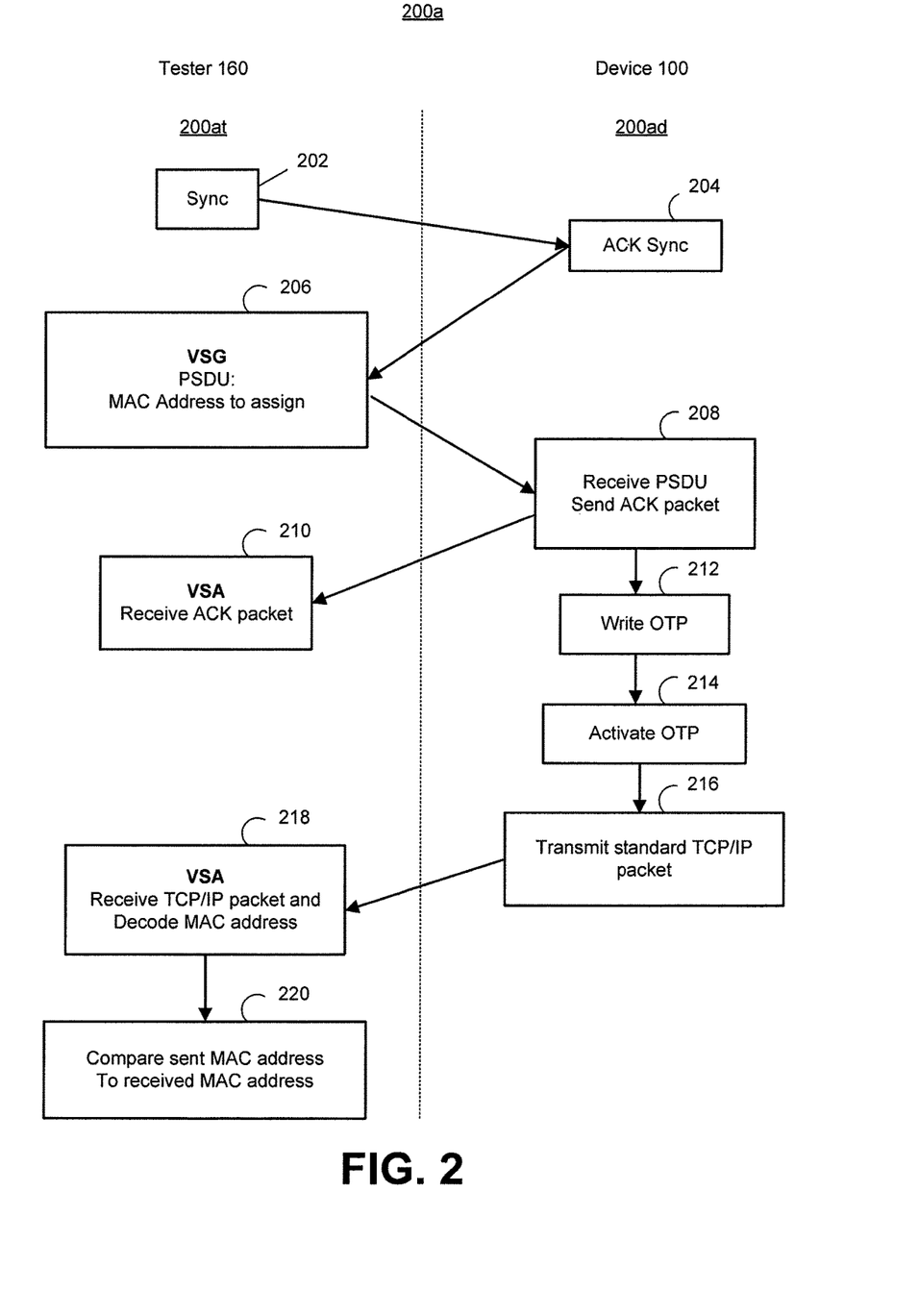
FIG. 2 depicts exchange of signals and information between a tester and IoT DUT in accordance with an exemplary embodiment of the presently claimed invention.

Referring to FIG. 2, in accordance with an exemplary embodiment 200a, the actions 200at of the tester 160 and the actions 200ad of the device 100 are performed as follows. (Similar to the test techniques described in the aforementioned patents and applications, predetermined blocks of data packets are exchanged between the tester 160 and DUT 100.) The tester 160 transmit a synchronization initiation signal 202, in response to which the device 100 transmits an acknowledgement signal 204 confirming synchronization. Once synchronization has been established, the tester 160 will transmit a predefined sequence of test packets (not shown) that make up the various blocks related to sets of transceiver transmitted and received signal tests. Once such block, agreed upon by both tester 160 and device 100 in terms of content and position within the predefined test sequence, is transmitted by the VSG 160g (FIG. 1) as a physical layer service data unit (PSDU) 206, and contains a MAC address. Following receipt by the device 100 of the packet with the MAC address, it transmits an acknowledgement packet 208 to inform the tester 160 that the packet has been received without a CRC (cyclic redundancy check) error. The VSA 160a (FIG. 1) receives this acknowledgement packet 210.

Having received the PSDU 208, the device 100 then programs its internal non-volatile memory 212, generally in the form of a one-time programmable (OTP) memory, with the received MAC address. The device 100 then activates the programmed MAC address 214, typically by a simple device reset. This enables the programmed MAC address, which now becomes part of transmitted data packets 216, one of which is transmitted back to the tester 160.

The tester 160 receives and decodes this standard data packet 218 to retrieve the MAC address that was stored in the memory of the device 100 and transmitted as part of the data packet 216. The tester 160 compares 220 this received MAC address with the MAC address originally transmitted by the VSG 160g as part of the PSDU 206. Confirmation of these two MAC addresses being identical serves as an indication to the tester 160 that the device 100 has completed its processing of the designated transmission block and is ready to continue the predefined test sequence.

Figure 3:
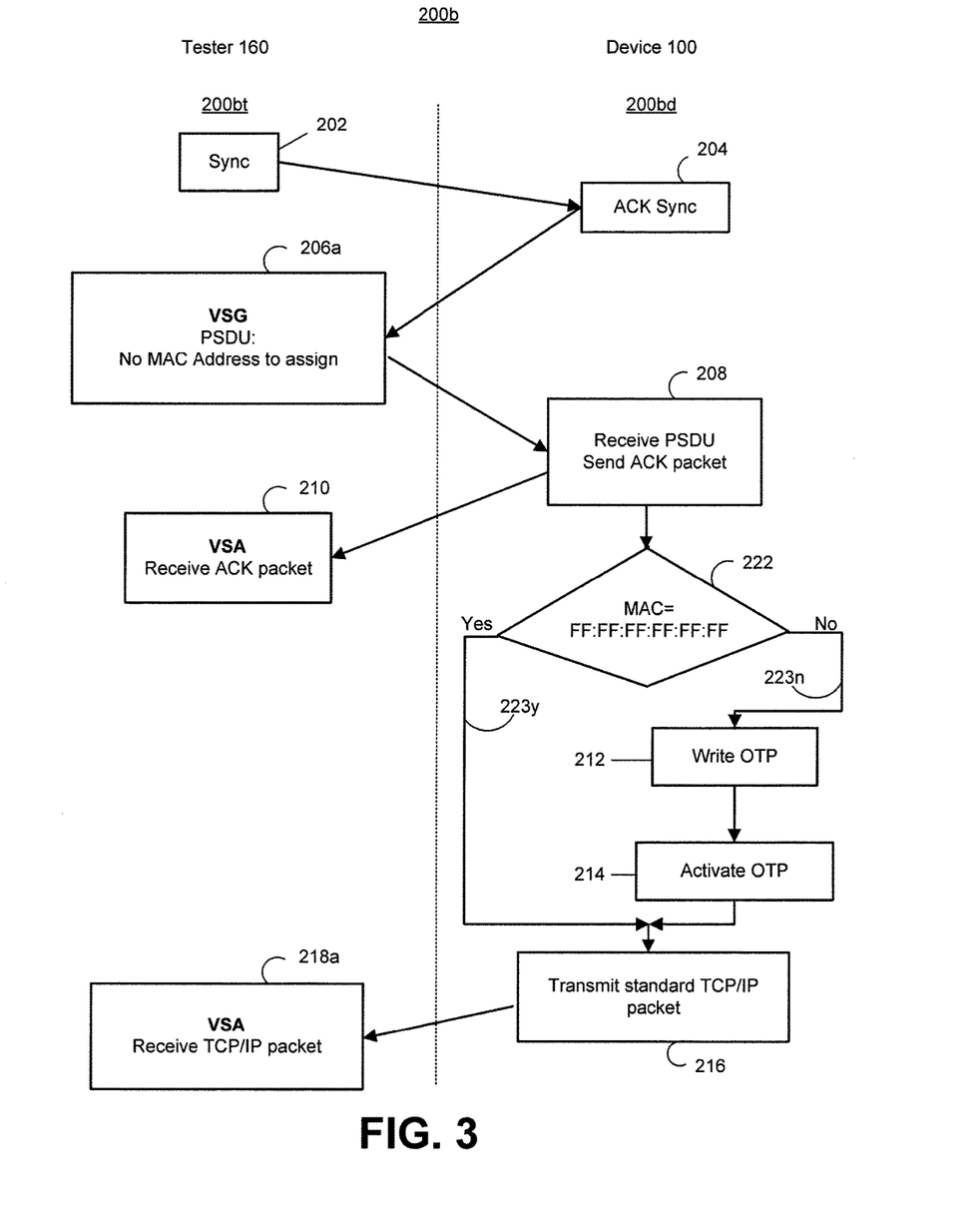
FIG. 3 depicts exchange of signals and information between a tester and IoT DUT in accordance with another embodiment of the presently claimed invention.

Referring to FIG. 3, in accordance with another exemplary embodiment 200b, the actions 200bt, 200bd of the tester 160 and device 100 interact such that following establishment of synchronization 202, 204, the VSG 160g transmits the PSDU 206a, in which a MAC address can be omitted, depending upon the choice of bits assigned to the data packet portion used for identifying a MAC address. The device 100 receives the PSDU and transmits an acknowledgement 208, which is received 210 by the VSA 160a. The device 100 also checks the data packet bits for identification of a MAC address assignment 222. If these bits indicate that a MAC address is to be assigned 223n, such MAC address is written to the OTP memory 212 and activated 214 as discussed above. Following this activation 214, a standard data packet is transmitted 216 for reception 218a by the VSA 160a.

Alternatively, the MAC address data may be the broadcast address containing all hexadecimal values F or an address starting with 00, as reserved addresses, or other predetermined MAC addresses as desired. If these data bits indicate such a MAC address 223y, no MAC address will be written to or activated from the OTP memory. Instead, the device 100 transmits a standard data packet 216 for reception 218a by the VSA 160a.

Further alternatively, other predefined MAC addresses can be used to assign other operations as well. Such an option can be used to allow multiple run testing with the same device 100 or, in cases where a test has failed, it may not be desirable to assign a valid MAC address yet, pending rework of the device 100 to achieve a successful test later.

Transmission of the standard data packet 216, as discussed above, indicates completion of processing of the transmission block by the device 100, and reception 218 by the VSA 160a completes that block operation.

Figure 4:
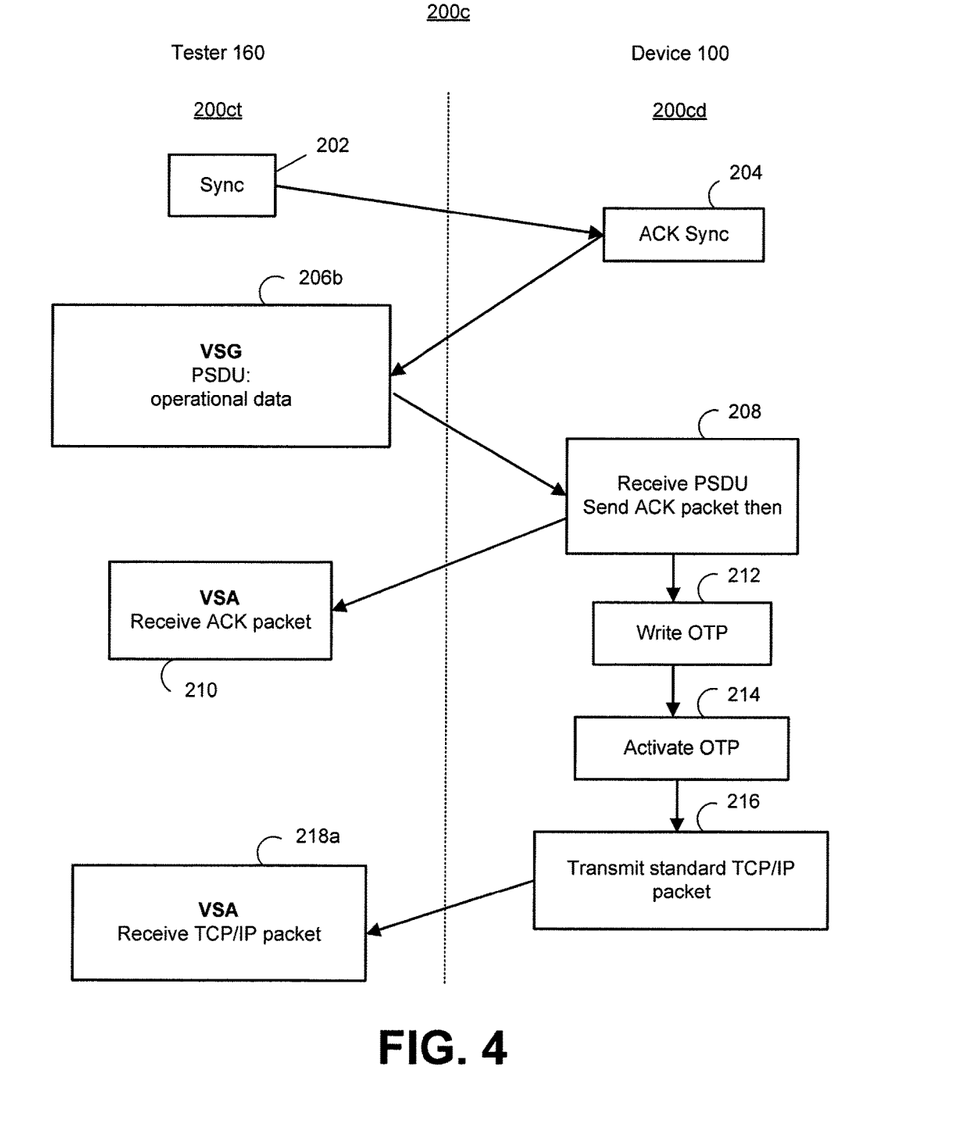
FIG. 4 depicts exchange of signals and information between a tester and IoT DUT in accordance with another embodiment of the presently claimed invention.

Referring to FIG. 4, in accordance with another exemplary embodiment 200c, the actions 200ct of the tester 160 and the actions 200cd of the device 100 are performed as follows. The VSG 160g transmits a PSDU 206b containing other operational data, such as calibration data for the device 100, as part of the payload of a packet block sent during the predefined sequence for use by the device 100 for a corresponding purpose (e.g., calibration of transmit signal power, signal frequency, bit rate, modulation type, etc.). As before, following reception and acknowledgement 208 of the PSDU, the operational data is written to 212 and activated within 214 the OTP memory, following which a standard data packet is transmitted 216 for reception 218a by the VSA 160a. Transmission of the standard data packet 216 indicates that the operational data has been received and stored and that the designated block is complete.

Alternatively, if it is not desirable to store the operational data within the OTP memory during this sequence (e.g., if calibration failed so such data is not valid), the device 100 can transmit 216 a default value of the contents of the OTP memory, or use one or more designated data packet bits to indicate whether data should be written or not, similar to the sequence described in the embodiment 200b of FIG. 3.

Figure 5:
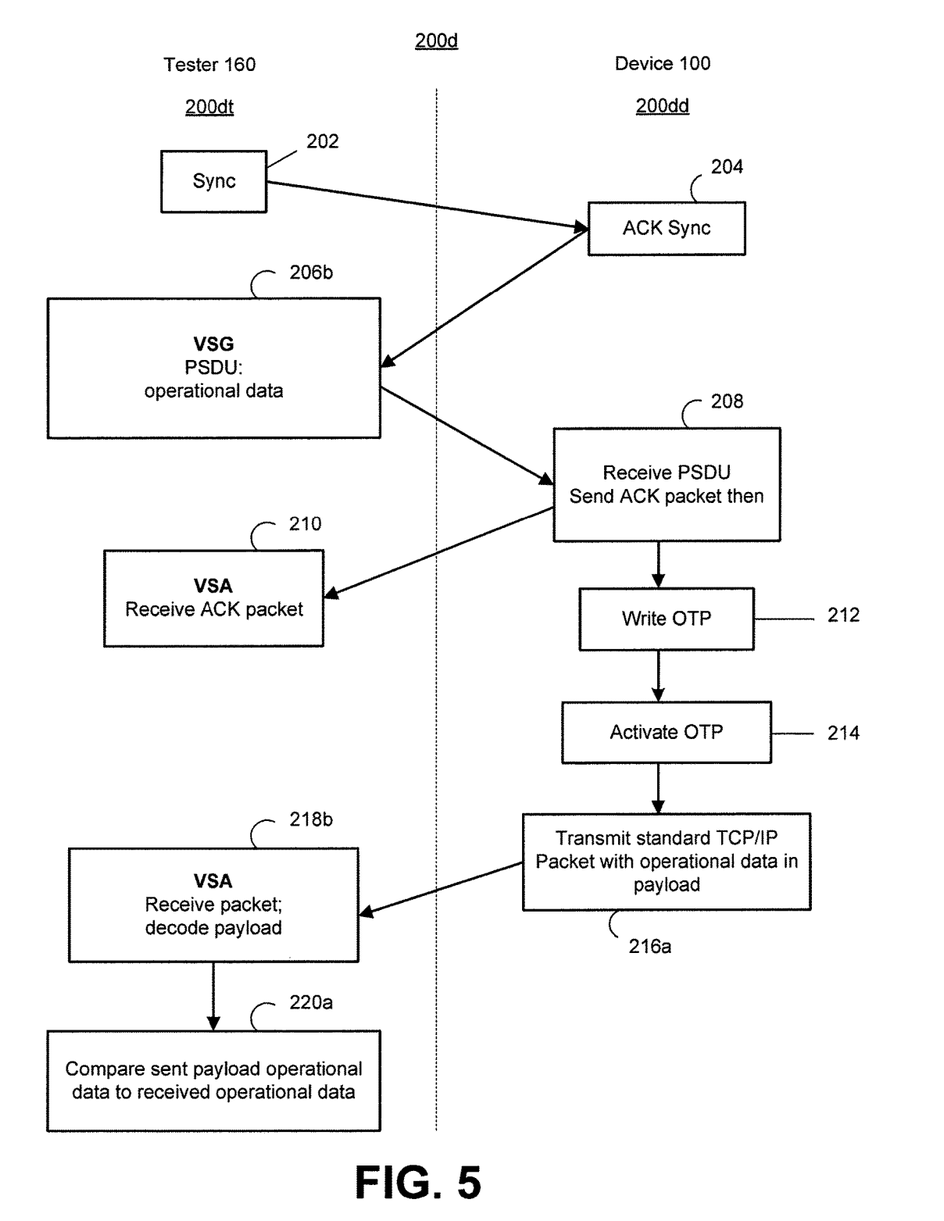
FIG. 5 depicts exchange of signals and information between a tester and IoT DUT in accordance with another embodiment of the presently claimed invention.

Referring to FIG. 5, in accordance with another exemplary embodiment 200d, the actions 200dt of the tester 160 and the actions 200dd of the device 100 are performed as follows. The operational data written to the OTP memory 212 can be included as part of the data packet payload in the standard data packet transmitted 216a by the device 100. Following reception and decoding 218b of this data packet by the VSA 160a, the decoded payload with the operational data can be compared to the operational data originally transmitted as part of the PSDU 206b. This allows the stored operational data to be further verified, similar to the sequence 200a of FIG. 2. This allows the tester 160 to verify that the operational data has been successfully transferred and stored in the device 100, while also identifying completion of the block.

Figure 6:
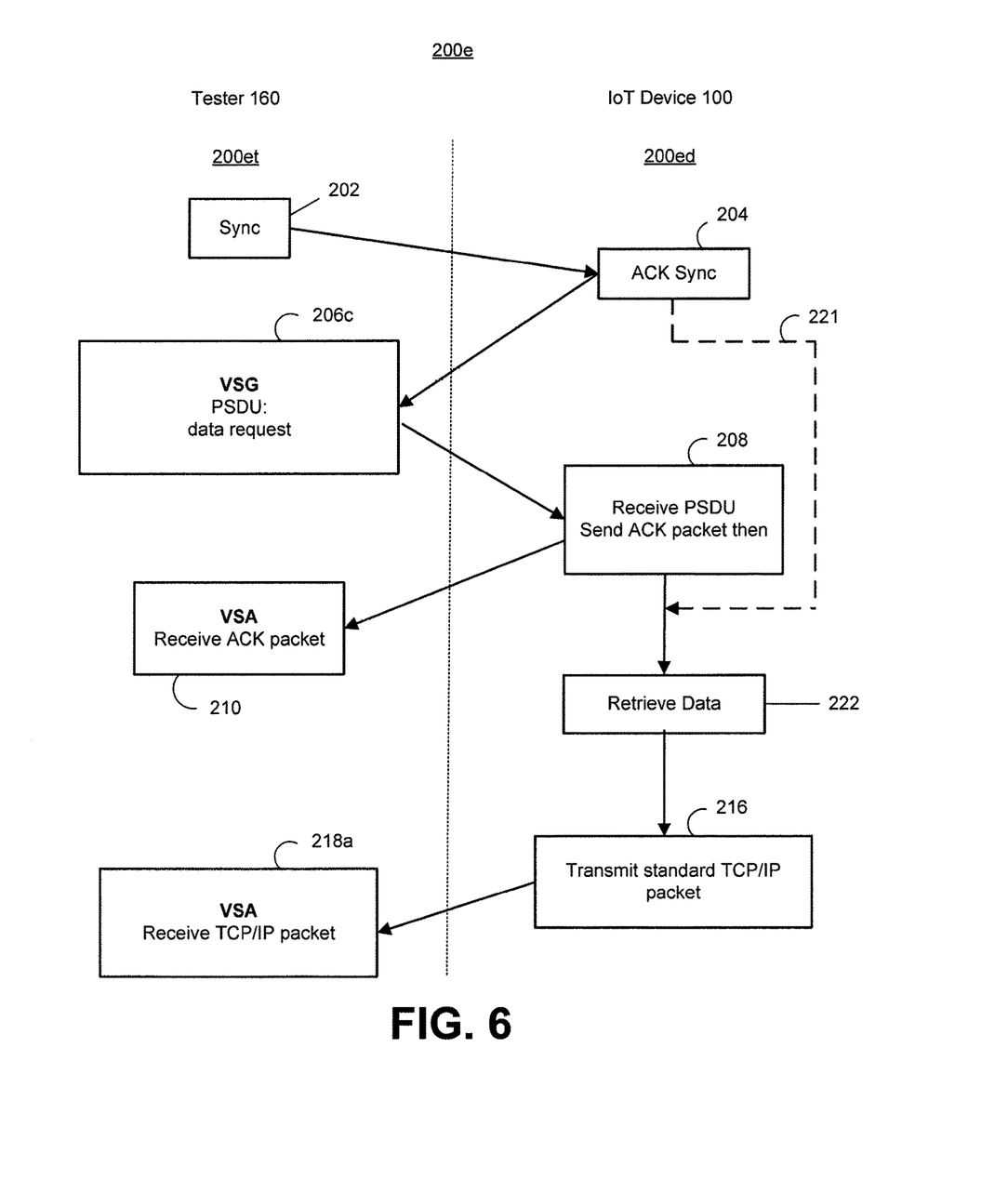
FIG. 6 depicts exchange of signals and information between a tester and IoT DUT in accordance with another embodiment of the presently claimed invention.

Referring to FIG. 6, in accordance with an alternative embodiment 200e, instead of, or in addition to, the VSG 160g transmitting a PSDU 206a/206b with MAC or operational data to be written to the OTP memory 212, the PSDU 206c can include a request for other data to be retrieved by the device 100 (instead or also) for inclusion as part of the data packet payload in the standard data packet to be transmitted 216. For example, instead of, or in addition to, writing 212 and activating 214 data in the OTP memory, the device 100 retrieves locally available data 222 and includes it as part of one or more payload packets for transmission 216. Such data can be of virtually any form from virtually any source, such as device operation data (e.g., RSSI data identifying the strength of the signal received from the tester 160, power data identifying the power consumption of the device 100, etc., stored in the memory 120) or device environment data (e.g., sensor data identifying a locally measured environmental parameter such as temperature, altitude, humidity, geographic location, etc., provided by one or more of the peripheral devices 140).

Further, also in accordance with such alternative embodiment 200e, the device 100 can be programmed such that, responsive to achievement of synchronization 202, 204, the desired data is retrieved 221, 222 and transmitted as part of the data packet payload in the standard data packet 216. In other words, it is not necessary that the VSG 160g transmit a data request 206c to be acknowledged 208 by the device 100.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for programming a device under test (DUT) during a test sequence, comprising:
   synchronizing a tester and a DUT, wherein said DUT has not yet been identified by a unique identification parameter; and
   following said synchronizing, receiving from said tester with said DUT data including a new unique identification parameter for said DUT;
   programming a non-volatile memory of said DUT with at least said new unique identification parameter of said DUT, followed by and independent of a signal from said tester,
   activating, with said DUT, said new unique identification parameter of said DUT, and transmitting, with said DUT, a data packet signal that includes said new unique identification parameter of said DUT.

2. The method of claim 1, wherein said synchronizing a tester and a DUT comprises:
   transmitting, with said tester, a synchronization initiation signal; and
   transmitting, with said DUT, a synchronization confirmation signal.

3. The method of claim 1, further comprising:
   following said synchronizing, transmitting, with said tester, a data signal including one or more data packets containing said new unique identification parameter of said DUT;
   transmitting, with said DUT, a response signal acknowledging receipt of said data signal by said DUT; and
   transmitting, with said DUT, another response signal in response to said request for data.

4. The method of claim 3, wherein said transmitting, with said tester, a data signal including one or more data packets containing said new unique identification parameter of said DUT comprises transmitting, with said tester, address data for identifying said DUT.

5. The method of claim 3, wherein said data packet transmitted by said DUT includes said new unique identification parameter of said DUT, and further comprising:
   decoding, with said tester, said data packet transmitted by said DUT; and
   comparing, with said tester, said decoded data packet and said new unique identification parameter of said DUT transmitted by said tester as part of said data signal.

6. The method of claim 1, further comprising receiving, with said tester, said data packet transmitted by said DUT.

7. A method for programming a device under test (DUT) during a test sequence, comprising:
   receiving, with a DUT, a synchronization initiation signal from a tester, wherein said DUT has not yet been identified by a unique identification parameter;
   transmitting, with said DUT, a synchronization confirmation signal; and
   following said synchronization, receiving from said tester with said DUT data including a new unique identification parameter for said DUT;
   programming a non-volatile memory of said DUT with at least said new unique identification parameter of said DUT, followed by and independent of a signal from said tester,
      activating, with said DUT, said new unique identification parameter of said DUT, and
      transmitting, with said DUT, a data packet signal that includes said programmed data representing a unique identification parameter of said DUT.

8. The method of claim 7, wherein said following said synchronization, receiving and programming data from said tester including said new unique identification parameter of said DUT comprises receiving, with said DUT from said tester, a data signal including one or more data packets containing said new unique identification parameter of said DUT or a request for data, and further comprising:
   transmitting, with said DUT, a response signal acknowledging receipt of said data signal by said DUT; or
   transmitting, with said DUT, another response signal in response to said request for data.

9. The method of claim 8, wherein said receiving, from said tester with said DUT a data signal including one or more data packets containing said new unique identification parameter of said DUT or a request for data comprises receiving, with said DUT from said tester, address data for identifying said DUT.

* * * * *